US012534220B2

(12) United States Patent
Lee et al.

(10) Patent No.: US 12,534,220 B2
(45) Date of Patent: Jan. 27, 2026

(54) COCKPIT SYSTEM INCLUDING OPERATING SYSTEM CONFIGURED TO USE PROJECTOR

(71) Applicant: HYUNDAI MOBIS CO., LTD., Seoul (KR)

(72) Inventors: Shin Jik Lee, Yongin-si (KR); Hyun Jun An, Yongin-si (KR); Dong Yeong Kim, Yongin-si (KR); Kyung Hoon Kim, Yongin-si (KR); Jun Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/910,413

(22) Filed: Oct. 9, 2024

(65) Prior Publication Data

US 2025/0214714 A1 Jul. 3, 2025

(30) Foreign Application Priority Data

Dec. 28, 2023 (KR) .................. 10-2023-0194335

(51) Int. Cl.
*G06F 3/01* (2006.01)
*B64D 43/00* (2006.01)
*G03B 29/00* (2021.01)

(52) U.S. Cl.
CPC ............ *B64D 43/00* (2013.01); *G03B 29/00* (2013.01); *G06F 3/016* (2013.01)

(58) Field of Classification Search
CPC ........ B64D 43/00; G03B 29/00; G03B 21/62; G03B 21/10; G06F 3/016; B60K 35/00; B60K 2360/334; B60K 35/29; B60K 35/25; B60K 35/10
See application file for complete search history.

(56) References Cited

U.S. PATENT DOCUMENTS

| 9,676,332 B2 | 6/2017 | Leary et al. |
| 9,902,265 B2 | 2/2018 | Lathrop et al. |
| 2009/0268163 A1 | 10/2009 | Bowden et al. |
| 2012/0287663 A1* | 11/2012 | Lathrop ................. B60K 35/10 362/558 |
| 2013/0179811 A1* | 7/2013 | Nagara .................. B60K 35/60 715/765 |
| 2017/0200386 A1* | 7/2017 | Smith ...................... G09B 9/16 |

(Continued)

FOREIGN PATENT DOCUMENTS

WO  WO 2014/143556 A1  9/2014

OTHER PUBLICATIONS

Extended European Search Report Issued on Apr. 23, 2025, in Counterpart European Patent Application No. 24209717.8 (9 Pages in English).

*Primary Examiner* — Rodney Amadiz
(74) *Attorney, Agent, or Firm* — NSIP Law

(57) ABSTRACT

A cockpit system for a cockpit in a mobile device includes: a projector disposed in the cockpit of the mobile device; and an operating system to display an image emitted from the projector. The operating system includes: a projection lens on which content emitted from the projector is displayed; a bezel disposed on an edge of the projection lens to provide rigidity to the projection lens; and a bracket to connect the projection lens and a frame of the mobile device to each other. The projection lens includes a light-transmitting element, a lens element, and a touch film.

7 Claims, 5 Drawing Sheets

(56) References Cited

U.S. PATENT DOCUMENTS

| 2018/0059520 A1* | 3/2018 | Dubois | G06F 3/03547 |
| 2019/0179527 A1* | 6/2019 | Channey | H03K 17/962 |
| 2023/0152914 A1 | 5/2023 | Oki et al. | |

* cited by examiner

COCKPIT SYSTEM INCLUDING OPERATING SYSTEM CONFIGURED TO USE PROJECTOR

CROSS REFERENCE TO RELATED APPLICATION(S)

This application claims the benefit of Korean Patent Application No. 10-2023-0194335, filed on Dec. 28, 2023, which is hereby incorporated by reference as if fully set forth herein.

BACKGROUND

Field of the Disclosure

The embodiments of the present disclosure relate to a display of a mobile device such as a vehicle and an unmanned aerial vehicle (UAV), and more particularly to a cockpit system including an operating system using a projector.

Discussion of the Related Art

Recently, as vehicles have become digitized, many controllers are installed into the vehicles. Various communication functions between the controllers may allow the vehicle's location to be remotely checked via the Internet or using a smartphone and may enable a user to discover nearby charging stations. All information about a current status of the vehicle, such as a battery charging state or a pre-conditioning state of the vehicle, is checked in real time by a button touch of a user (or driver). In addition, an intelligent driving assistance system acquires information about road driving to make driving more convenient for a driver.

In this regard, a cluster can be used in the vehicle. The cluster may provide the basic functions of the vehicle, for example, a driving speed, a mileage, a tachograph, and an instrument panel function showing an engine speed (engine rpm). For example, the cluster may provide accurate and convenient vehicle information required for charging infrastructure network information, a driving range, a battery current status, information output, and other driving environments.

In particular, vehicles have recently used digital clustering of various digital cockpits to effectively express vehicle information. Therefore, there is a need to develop technology that can handle these digital cockpits in an integrated manner.

Additionally, in recent vehicles, there is a demand for various display types to provide convenience of use for drivers and passengers, and there is a demand for technology that can change the layout of cockpits according to such display types.

SUMMARY

The present disclosure is intended to solve the above-mentioned problems. An object of the present disclosure is to provide a cockpit system including an operating system configured to use a projector.

Another object of the present disclosure is to provide a light-transmitting display capable of providing information to a driver and passengers by transmitting light to the operating system.

Technical subjects to be solved by the present disclosure are not limited to the above-mentioned technical solutions, and it should be noted that other technical subjects not described above can be understood by those skilled in the art from the description of the present disclosure below.

In accordance with an embodiment of the present disclosure, a cockpit system for a cockpit in a mobile device includes: a projector disposed in the cockpit of the mobile device; and an operating system configured to display an image emitted from the projector. The operating system includes: a projection lens on which content emitted from the projector is displayed; a bezel disposed on an edge of the projection lens to provide rigidity to the projection lens; and a bracket configured to connect the projection lens and a frame of the mobile device to each other, wherein the projection lens includes a light-transmitting element, a lens element, and a touch film.

The projection lens may include a plurality of layers, wherein the plurality of layers includes the light-transmitting element as a first layer, the lens element as a second layer, and the touch film as a third layer.

The light-transmitting element may include at least one of a translucent leather, a translucent paint, and a translucent film.

The lens element may include at least one of polycarbonate (PC) and polymethyl methacrylate (PMMA).

The projection lens may include: a first lens configured to display first content emitted from the projector; and a second lens configured to display second content emitted from the projector.

The first lens may display at least one function from among media, sound, and favorites in a shortcut format.

The second lens may display at least one function from among a driver's driving-related cluster, cluster widget, map, media, and weather.

The projection lens may provide at least one from among touch, haptic, and hover functions through the touch film.

The bracket may further include a haptic module, and the bracket may transmit haptic vibration generated from the touch film to the haptic module.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIGS. 4 and 5 are diagrams illustrating an example configuration of the operating system displayed using a projector according to an embodiment of the present disclosure.

DETAILED DESCRIPTION

Figure 1:
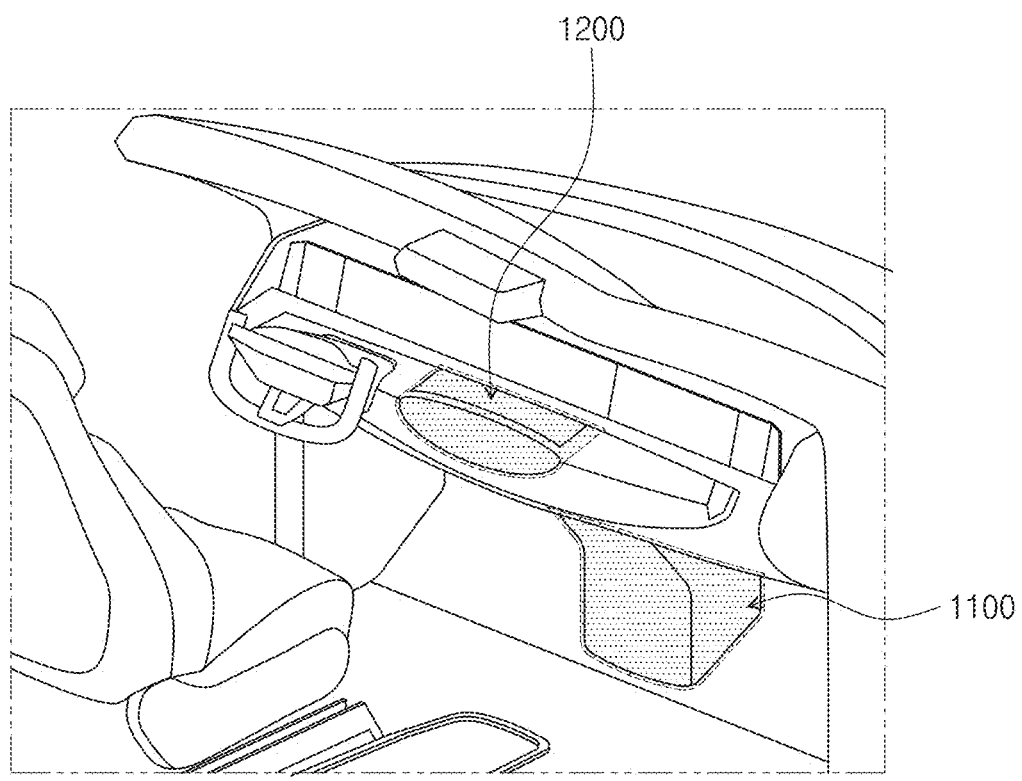
FIGS. 1 and 2 are diagrams illustrating examples of a cockpit system including an operating system using a projector according to an embodiment of the present disclosure.

Hereinafter, embodiments of the present disclosure will be described in detail with reference to the accompanying drawings so that the present disclosure may be easily realized by those skilled in the art. However, the present disclosure may be achieved in various different forms and is not limited to the embodiments described herein. In the drawings, parts that are not related to a description of the present disclosure are omitted to clearly explain the present disclosure and similar reference numbers will be used throughout this specification to refer to similar parts.

In the specification, when a part "includes" an element, it means that the part may further include another element rather than excluding another element unless otherwise mentioned.

Figure 2:
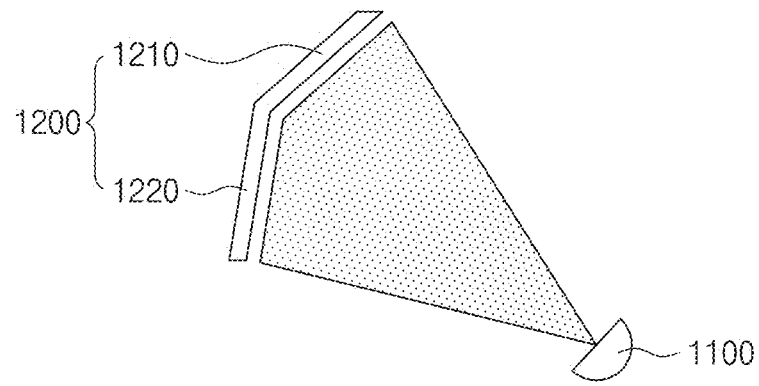

FIGS. 1 and 2 are diagrams illustrating examples of a cockpit system including an operating system using a projector according to an embodiment of the present disclosure.

FIGS. 1 and 2 illustrate embodiments in which a cockpit system is implemented in a projection manner using an internal projector 1100.

In order to implement a display-type cockpit system, a light-emitting display such as a light emitting diode (LED) display can be used, but there are many curves/curved surfaces in the interior space of a mobile device such as a vehicle, and it is difficult to implement a light-emitting display considering such in-vehicle interior characteristics.

Therefore, in one embodiment of the present disclosure, the operating system 1200 is configured in a projection manner using the internal projector 1100 of the mobile device, and the operating system 1200 is advantageous in that it can be freely implemented even in a space where many curves/curved surfaces exist as shown in FIG. 2.

The operating system using a projector may enable an image emitted from the projector to be implemented by a multi-faceted operating system. Shortcut-type content may be displayed on a first lens 1210 of the operating system 1200, and HVAC content implemented in an animation manner may be displayed on a second lens 1220 of the operating system 1200.

For example, a lower end 1220 of the operating system may enable images to be projected even on double-curved surfaces, thereby increasing the degree of freedom of a design.

Figure 3:
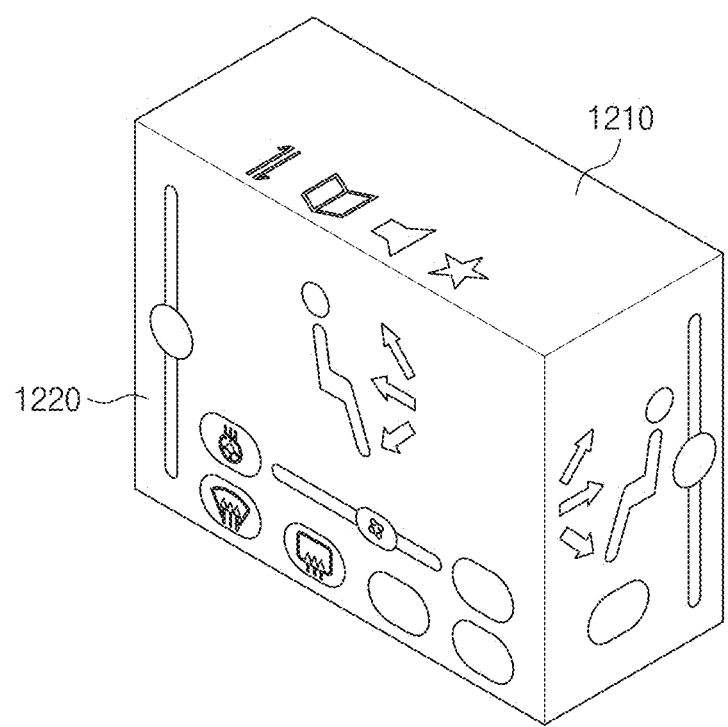
FIG. 3 is a diagram illustrating example content of an operating system displayed using a projector according to an embodiment of the present disclosure.

FIG. 3 is a diagram illustrating example content of the operating system displayed using a projector according to an embodiment of the present disclosure.

Referring to FIG. 3, a first lens 1210 of the operating system 1200 is an application related to user settings, and can output applications such as media, sound, and favorites.

A second lens 1220 of the operating system 1200 can output the driver's driving-related cluster, cluster widget, map, media, and weather-related applications, and the applications can be output according to the driver's (or passenger's) operation or condition settings.

However, the configuration of the display described above is merely an example, and the corresponding regions may be integrated and displayed according to the driver/passenger's operation or condition settings. For example, as will be described later, depending on the display mode, one image integrated into the first lens 120 and the second lens 130 may be displayed.

Figure 4:
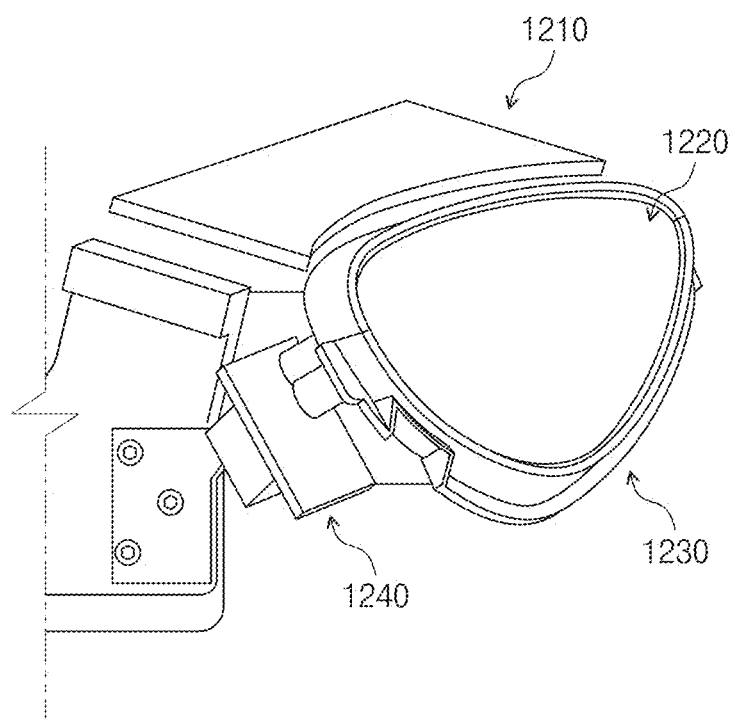
FIGS. 4 and 5 are diagrams illustrating an example configuration of an operating system displayed using a projector according to an embodiment of the present disclosure.
Figure 5:
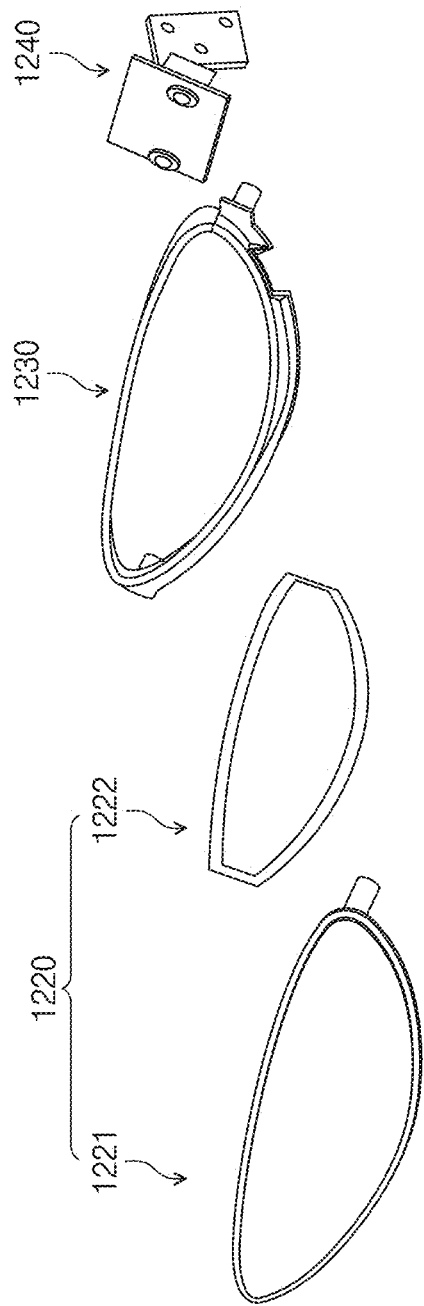

Referring to FIGS. 4 and 5, a cockpit including an operating system using a projector according to the present disclosure may include a projector 1100 and an operating system 1200.

The projector 1100 may be placed in a cockpit within a vehicle. The projector 1100 may output an image to the operating system 1200 so as to provide information to the operating system of the vehicle. The image output from the projector 1100 may be provided to the user through the operating system 1200.

The operating system 1200 may include a projection lens 1210, a haptic lens 1220, a bezel 1230, and a mounting bracket 1240.

Each of the projection lens 1210 and the haptic lens 1220 may display a portion of the operating system screen through a projection lens on which the image emitted from the projector 1100 is projected. The projection lens 1210 may be the first lens of the operating system.

The haptic lens 1220 may include a lens 1221 and a touch film 1222. The haptic lens 1220 may have a light-transmitting element laminated on the front surface of the lens 1221, and a touch film 1222 may be laminated on the back surface of the lens 1221. The haptic lens 1220 may be the second lens of the operating system.

The light-transmitting element may include at least one of translucent leather, translucent paint, and a translucent film.

When the light-transmitting element is translucent leather, the translucent leather may require conditions such as luminance, contrast ratio, material pattern, and the like.

For example, the luminance of the translucent leather may be 500 cd/m2 or more. The material patterns of the translucent leather require a material pattern that does not impair image clarity, are designed to avoid large or irregular patterns.

If the light-transmitting element is made of the translucent paint, an image can be realized by painting with transparent textured paint.

The lens 1221 may be made of a material such as acrylic or polycarbonate (PC). For example, the lens 1221 may use at least one material selected from among polymethyl methacrylate (PMMA) and CLEAR PC.

The lens 1221 may be set to a preset thickness or more to avoid inconvenience of a user who handles the operating system. For example, the lens 1221 may be set to a thickness of 4 T or more.

The touch film 1222 may be a film for a touch and hovering function of the operating system. Accordingly, functions such as touch, haptic, and hover for the operating system can be implemented by combining the lens 1220 and the touch film 1222.

The bezel 1230 is disposed on the edge of the haptic lens 1220 to ensure rigidity of the structure.

The mounting bracket 1240 may connect the haptic lens 1220 and a vehicle frame to each other. The mounting bracket 1240 may transmit haptic vibration generated from the haptic lens 1220 to a haptic module (not shown).

Figure 6:
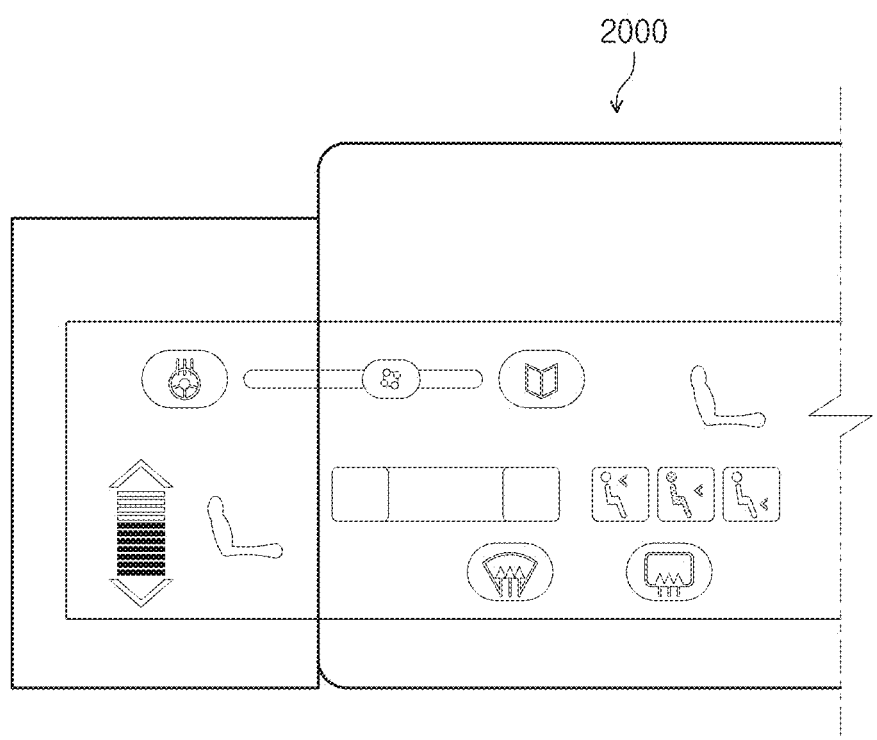
FIG. 6 is a diagram illustrating an example of an operating system displayed using a projector according to an embodiment of the present disclosure.

FIG. 6 is a diagram illustrating an example of the operating system displayed using a projector according to an embodiment of the present disclosure.

Referring to FIG. 6, the operating system using the projector according to the present disclosure may display the operating system screen 2000 through a lens having a back surface onto which an image is projected, and the lens may be made of other materials excluding translucent leather so that light transmission for the lens can be implemented. As a result, the operating system can be configured to have color, material, and finishing (CMF) suitable for various situations and purposes.

When the translucent paint is used in a light-transmitting element, an image emitted from the projector 1100 can be realized by painting the lens with a transparent textured paint. A lens using a translucent paint may include a plurality of layers.

For example, an optical film may be used in a first layer (Layer1), a transparent substrate may be used in a second layer (Layer2), and a transparent textured paint may be used in a third layer (Layer3).

At this time, the projection image emitted from the projector 1100 sequentially passes through the first layer, the second layer, and the third layer, the resultant image is finally focused on the third layer and the user can check the image output on the layers.

Meanwhile, when the translucent film is used in the light-transmitting element, an image emitted to the projector 1100 can be implemented by merging the lens and the translucent film. The lens in which the translucent film is used may include a plurality of layers.

For example, an optical film may be used in the first layer (Layer1), a transparent substrate (PC or PMMA) may be used in the second layer (Layer2), and a translucent film may be used in the third layer (Layer3).

At this time, the projection image emitted from the projector 1100 sequentially passes through the first layer, the second layer, and the third layer, the resultant image is finally focused on the third layer and the user can check the image output on the layers.

A detailed description of preferred embodiments of the present disclosure disclosed as described above is provided so that those skilled in the art can implement and embody the present disclosure. Although the description is made with reference to the preferred embodiments of the present disclosure, it will be appreciated by those skilled in the art that various modifications and variations can be made in the present disclosure without departing from the spirit or scope of the disclosures. For example, those skilled in the art may use the respective components described in the above-described embodiments in a manner of combining them with each other.

Accordingly, the present disclosure is not intended to be limited to the embodiments shown herein, but to be given the broadest scope that matches the principles and novel features disclosed herein.

As is apparent from the above description, the cockpit system including the operating system designed to use a projector can be effectively configured.

Specifically, the embodiments of the present disclosure can implement a light-transmitting display that can provide information to a driver and passengers by transmitting light to the operating system, so that necessary information can be provided to the driver and passengers.

It will be apparent to those skilled in the art that various modifications and variations can be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A cockpit system for a cockpit in a mobile device, comprising:
    a projector disposed in the cockpit of the mobile device; and
    an operating system configured to display an image emitted from the projector,
    wherein the operating system includes:
    a projection lens on which first content emitted from the projector is displayed;
    a haptic lens disposed at an angle with respect to the projection lens and on which second content emitted from the projector is displayed;
    a bezel disposed on an edge of the haptic lens to provide rigidity to the projection lens; and
    a bracket configured to connect the haptic lens to a frame of the mobile device,
    wherein the haptic lens includes a lens element, a light-transmitting element laminated on a front surface of the haptic lens, and a touch film laminated on a back surface of the haptic lens.

2. The cockpit system according to claim 1, wherein the light-transmitting element includes at least one of a translucent leather, a translucent paint, and a translucent film.

3. The cockpit system according to claim 1, wherein the lens element includes at least one of polycarbonate (PC) and polymethyl methacrylate (PMMA).

4. The cockpit system according to claim 1, wherein the projection lens is configured to display at least one function from among media, sound, and favorites in a shortcut format.

5. The cockpit system according to claim 4, wherein the haptic lens is configured to display at least one function from among a driver's driving-related cluster, cluster widget, map, media, and weather.

6. The cockpit system according to claim 1, wherein the haptic lens provides at least one from among touch, haptic, and hover functions through the touch film.

7. The cockpit system according to claim 6, wherein the bracket further includes a haptic module, and
    wherein the bracket is configured to transmit haptic vibration generated from the touch film to the haptic module.

* * * * *